United States Patent [19]
Scott

[11] 3,927,609
[45] Dec. 23, 1975

[54] WIENIE WIGGLER ROASTING IMPLEMENT

[76] Inventor: Ronald J. Scott, 3783 Creekview Drive, Cincinnati, Ohio 45241

[22] Filed: Mar. 14, 1974

[21] Appl. No.: 450,988

[52] U.S. Cl. .................................................. 99/419
[51] Int. Cl.² ............................................ A47J 37/04
[58] Field of Search ...................... 99/419, 420, 421; 15/143 B, 144 B; 30/322, 323, 344; 17/1 S

[56] References Cited
UNITED STATES PATENTS

| | | | |
|---|---|---|---|
| 607,908 | 7/1898 | Arnold | 15/143 B X |
| 1,036,401 | 8/1912 | Woodley | 15/144 B X |
| 2,404,495 | 7/1946 | Hallum | 30/322 |
| 2,535,548 | 12/1950 | Porter | 99/421 A |
| 2,909,987 | 10/1959 | Crites | 99/419 |
| 3,091,790 | 6/1963 | Schroeder | 15/143 B X |
| 3,153,252 | 10/1964 | Ricciardi | 15/143 B |
| 3,266,144 | 8/1966 | Fishlove | 30/322 |
| 3,407,424 | 10/1968 | Lanzarone et al. | 15/143 B X |
| 3,745,910 | 7/1973 | Delamater | 99/419 |

FOREIGN PATENTS OR APPLICATIONS

| | | | |
|---|---|---|---|
| 208,870 | 11/1966 | Sweden | 15/144 B |

*Primary Examiner*—Harvey C. Hornsby
*Assistant Examiner*—Arthur O. Henderson

[57] ABSTRACT

A culinary implement for use in the roasting of wienies and consisting of a telescopic rod adapted to expand from an approximate 6 inch storage length to an approximate 30 inch usable length with a spring loaded retractable fork at one end thereof for use in the roasting of wienies, marshmallows, and the like, the fork being normally stored within the rod and telescopically movable thereoutof to expand to a general V shape for the roasting of two wienies or the like simultaneously or for the more secure gripping of a single wienie during the roasting process.

2 Claims, 8 Drawing Figures

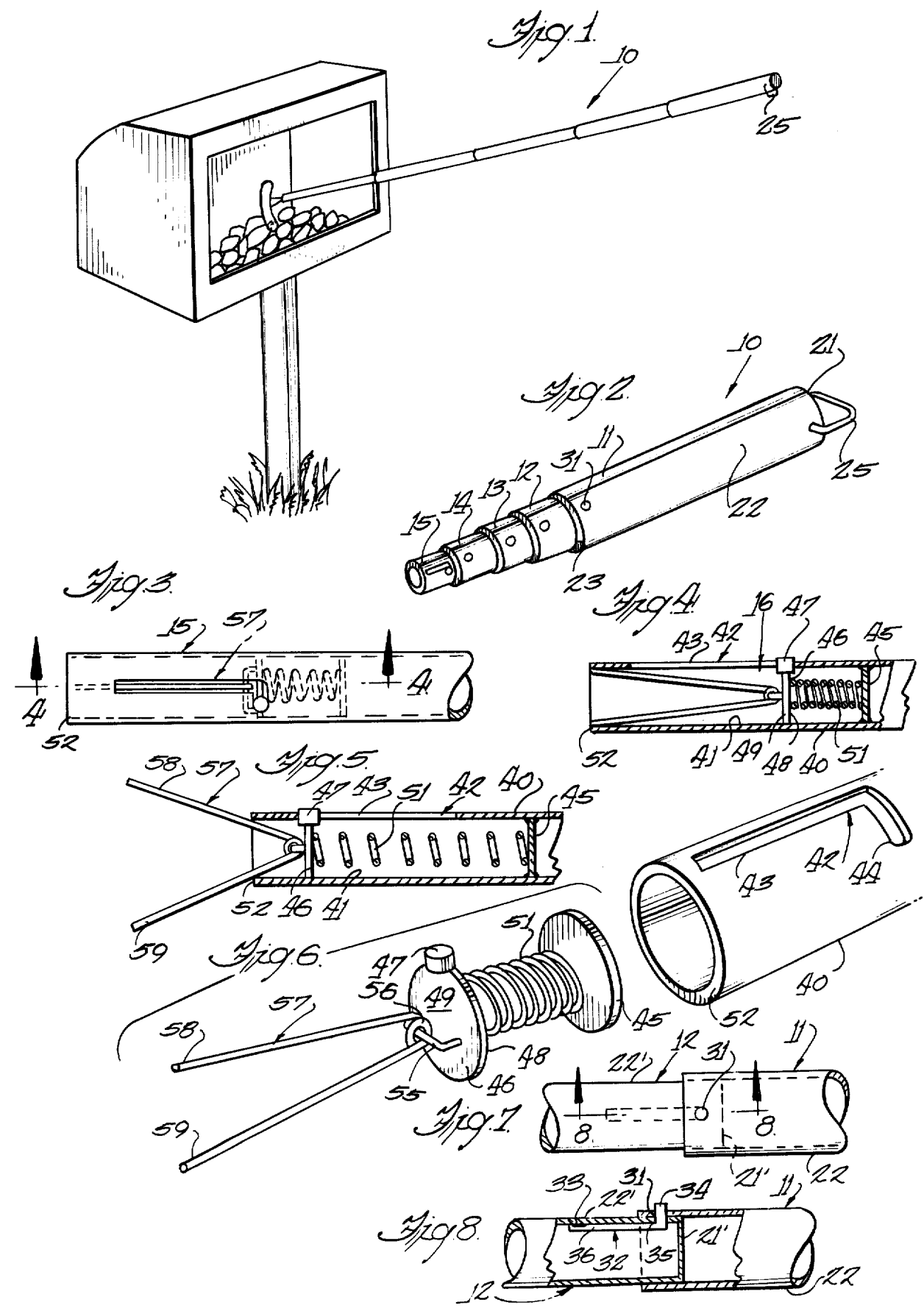

3,927,609

1

WIENIE WIGGLER ROASTING IMPLEMENT

BACKGROUND OF THE INVENTION

1. Field of the Invention

This invention relates generally to culinary tools and more particularly to a novel and improved wienie roasting implement intended for use in the roasting of wienies over an open fire and the like.

2. Description of the Prior Art

It has long been known to roast wienies, marshmallows and the like over an open fire, charcoal grill, and the like by placing the wienie at the end of a long rod or other implement such that an individual may hold the rod at one end a safe distance from the hot fire over which the wienie is being roasted. Such devices come in various sizes and configurations and are generally as illustrated in U.S. Pat. Nos. 3,339,478; 2,487,651; 2,909,987; and 2,838,990.

Such devices have all in common an elongated rod for supporting the wienie at a safe distance from the fire, with this causing problems in the transport of such rod for use in camp outs and the like in view of the necessary length of the rod and the inconvenience and clumsy manner of having to carry a multiplicity of the rods for later use. Further, the pointed prong ends of such rods pose a hazard during the transportation and carrying thereof due to their sharpness and projection from the rod.

SUMMARY OF THE INVENTION

The present invention recognizes the problems involved in the roasting of wienies over an open fire and the like, and provides a novel solution thereto in the form of a roasting implement which overcomes all of the foregoing deficiencies and disadvantages of presently available implements by providing a telescopic handle which collapses into itself into a compact and conveniently carried implement and in which the sharp fork end thereof is safely telescopically stored in one end of the rod to avoid injury during the carrying and transport of the collapsed rod.

It is a feature of the present invention to provide a readily portable wienie roasting implement which is readily expanded to its usable length in a minimum of time and without requiring any special tools or expertise, and which is just as readily collapsed back into its storage and carrying position for ease in transport between locations on the person of an individual.

Among further features and advantages of the present invention is the provision of a wienie wiggler roasting implement which is relatively simple in its construction and which therefore may be readily manufactured at a relatively low cost and by simple manufacturing methods; one which is possessed of few parts and which therefore is unlikely to get out of order; one which is of a rugged and durable construction and which therefore may be guaranteed by the manufacturer to withstand many years of intended usage; one which is of an aesthetically pleasing and refined appearance; one which is easy to use and reliable and efficient in operation; one which can be retailed at a sufficiently low price to encourage its widespread use; and one which is otherwise well adapted to perform the services required of it.

Other features and advantages of this invention will be apparent during the course of the following description.

2

BRIEF DESCRIPTION OF THE DRAWINGS

In the accompanying drawings forming a part of this specification, and in which like reference characters are employed to designate like parts throughout the same:

FIG. 1 is a perspective view of the roasting implement in its extended position and illustrated in use with an open charcoal type fire;

FIG. 2 is a perspective view of the roasting implement in the collapsed storage position;

FIG. 3 is a fragmentary side elevational view of the front end of the roasting implement;

FIG. 4 is a cross-sectional view taken along Line 4—4 of FIG. 3 with the fork element in the collapsed storage position;

FIG. 5 is a cross-sectional view similar to FIG. 4 but illustrating the fork in the extended operating position;

FIG. 6 is a fragmentary exploded perspective view of the fork end of the roasting implement;

FIG. 7 is a fragmentary side elevational view of a joint connecting two of the segments of the rod; and FIG. 8 is a cross-sectional view taken along Line 8—8 of FIG. 7.

DESCRIPTION OF THE PREFERRED EMBODIMENT

Referring now to the drawings in detail there is illustrated a preferred form of a wienie wiggler roasting implement constructed in accordance with the principles of the present invention and designated generally in its entirety by the reference numeral 10 and which is comprised of a plurality of interfitting telescopically disposed rod segments 11–15 with segment 11 forming the back end and with segment 15 forming the front end, and with segment 15 having disposed therein a fork mechanism generally designated by reference numeral 16. The implement 10 may be manufactured out of any suitable heat resistant material with the preferred embodiment being manufactured out of steel for long life and durability and for its heat resistant characteristics.

Segment 11 is of an elongated hollow configuration having a back end 21, cylindrical side walls 22, and an open front end 23. Each of segments 12, 13, and 14 are similarly constructed as to having a closed back end, cylindrical side walls, and an open front end. A loop shaped handle 25 is provided adjacent back surface 21 and is pivotally connected to side walls 22 of segment 11 for ease in carrying and hanging the implement 10 for purposes of storage, transportation, and the like.

Referring to FIGS. 7 and 8 a typical connection between the segments 11–15 is illustrated as used in maintaining the telescopic position of the segments relative to each other, and for purposes of illustration the joint between segments 11 and 12 has been selected with the back surface and cylindrical side wall surfaces of segment 12 being designated by reference numerals 21' and 22' respectively. Adjacent front end 23 of segment 11 there is provided a radially directed aperture 31 extending therethrough. Adjacent bottom surface 21' of segment 12 and disposed inwardly thereof there is provided an L-shaped spring member 32 having the leg portion thereof extending longitudinally along an interior of side wall surface 22' and being affixed thereto at the end thereof by a solder joint 33 or the like, the opposite end of the leg portion terminating in a radially extending foot portion 34 which passes through an opening 35 in wall surface 22' and which is adapted to be lockingly received in associated opening 31 of segment 11 when opening 35 is in axial alignment therewith, at which time the resilient spring force of leg portion 36 urges foot portion 34 radially outwardly of segment 12 to retain segment 12 telescopically projecting from segment 11. To collapse segment 12 into segment 11 it is only required to depress foot portion 34 inwardly of opening 31 until it is disengaged therefrom, after which segment 12 may be telescopically collapsed into segment 11. It is to be understood that the joints between segments 13 and 12, segments 14 and 13, and segments 15 and 14 are of the same construction and thus permit for the compact collapsing of the segments relative to each other as well as the telescopic expansion of the segments relative to each other, the preferred embodiment collapsing to an overall length of approximately six inches and expanding to an overall length of approximately thirty inches.

The front end portion of segment 15 is comprised of cylindrical side walls 40 defining an elongated passageway 41 therebetween with there being formed in a portion of the side wall an L-shaped slot 42 having leg portion 43 extending longitudinally along the side wall and foot portion 44 extending circumferally about a portion of the side wall. Disposed rearwardly of foot portion 44 is wall member 45 which is secured in passageway 41 by welding or the like. A disc shaped operating member 46 having a diameter slightly less than the diameter of passageway 41 is received in the passageway and is provided with an operating member 47 extending radially from a peripheral edge thereof and adapted to be received in slot 42 and which projects exteriorly of the slot for operation by an individual's thumb or the like in moving the disc 46 along the slot 42. The disc 46 is provided with a back surface 48 and a front surface 49. A coiled spring 51 is interposed between wall 45 and back surface 48 of disc 46 and operates to resiliently bias disc 46 in a direction outwardly from wall 45 in the direction of open front end 52 of segment 15. When operating member 47 is engaged in foot 44 the spring 51 is retained in the tensioned compressed position, with an individual moving operating member 47 circumferally until it is aligned with leg portion 43 at which time spring 51 drives operating disc 46 in a direction away from wall 45 as guided along the leg portion of the slot 42 with the front end of the leg portion of the slot acting as a maximum stop for movement of the disc 46.

The front surface 49 of disc 46 is provided with a U-shaped clip member 55 about which there is coiled the vertex end 56 of a generally V-shaped spring fork member 57 having prongs 58 and 59. The length of fork 57 is such as to be completely retained in segment 15 when disc 46 is in the collapsed locked position engaged in slot foot portion 44, with movement of the disc along the leg slot portion 43 projecting the fork 57 outwardly of segment 15 front end 52 in which position the normal spring tendency of the fork expands the prongs 58–59 in an apart direction for use in supporting a plurality of wienies, marshmallows, and the like at the end thereof.

In operation, an individual first telescopically extends segments 11-15 to their maximum length, after which an individual moves operating lever 47 circumferally through foot portion slot 44 until aligned with leg portion slot 43, at which time spring 51 telescopes the fork 57 into the extended operative position. The implement 10 is now ready for use. Upon completion of usage, an individual retracts operating member 47 longitudinally through leg portion slot 43 until aligned with foot portion slot 44 at which time the individual moves the operating member circumferally to engage it in the foot portion slot and retain spring 51 in the compressed position. The foot members 34 of the respective segments are then depressed in a manner to provide for the collapsing of the segments 11-15 relative to each other, after which the device is in the collapsed position for ease of storage and transportation.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A culinary implement for the roasting of wienies, marshmallows, and the like, comprising:

a plurality of elongated cylindrical tubular segment members telescopically disposed relative to each other and moveable between a collapsed storage and carrying position and an extended telescopic operative position, said segments including a back handle segment and a front fork carrying segment, each segment being defined by an elongated cylindrical configuration having a closed disc shaped back end, depending cylindrical type walls, and an open front end, and wherein each segment is of a different diameter to permit the telescopic collapsing and extension of said segments relative to each other, wherein said front fork segment further comprises a passageway extending through the front open end thereof, a wall surface disposed normal to the longitudinal axis of said passageway and afixed in said passageway in a position inwardly of said segment front end, an L-shaped slot disposed in said side wall, said L-shaped slot comprising a ledge portion extending longitudinally along said side wall from a position adjacent said open front end to a position outwardly of said inner wall, and a foot portion extending circumferally of said side wall, a disc member of a diameter adapted to be received in said passageway disposed normal to the longitudinal axis of said passageway, an operating member afixed to the peripheral edge of said disc member and adapted to pass through said side wall slot for engagement exteriorly of said side wall, a coiled spring disposed intermediate a back surface of said disc member and a confronting surface of said inner wall, a clip afixed to a front surface of said disc member, and a generally V-shaped resilient fork member having its apex afixed to said clip member with its legs defining prong members, said fork member being of a length to be completely received in said fork segment when said operating member is in said slot put portion;

means adapted to retain the telescopic extended positions between adjacent segments; and a spring loaded fork assembly disposed in said fork segment and adapted to be moved between a collapsed storage position disposed inwardly of said front fork segment and an operative position extending outwardly of said front fork segment.

2. The implement as set forth in claim 1 wherein said segments are provided adjacent said front open end thereof with a radially extending aperture, and each of said adjacent segments is provided adjacent said back surface thereof with a generally L-shaped resilient spring member having a leg portion and a foot portion, said leg portion extending longitudinally along an interior surface of said segment side wall and permanently affixed thereto at the end thereof, and said foot portion passing radially through an aperture provided in said side wall adjacent said bottom surface thereof and adapted to be engaged in an associated aperture of said adjacent segment when said apertures are in axial alignment, said foot portion effecting positive locking engagement between said segments when in the extended telescoped position.

* * * * *